2,830,769

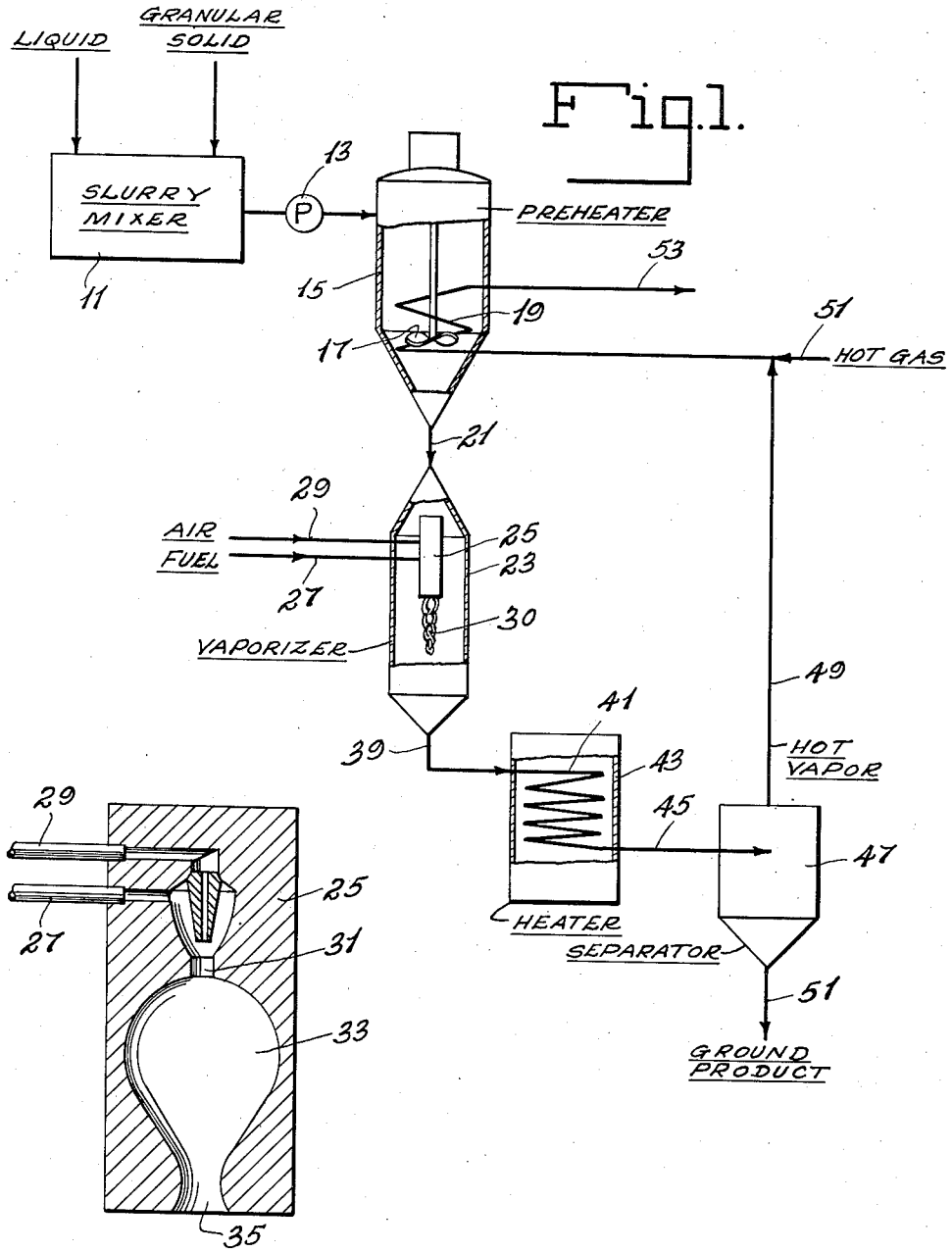

METHOD AND APPARATUS FOR TREATING A SOLID MATERIAL

Lincoln T. Work, Maplewood, N. J., assignor to Texaco Development Corporation, New York, N. Y., a corporation of Delaware Application May 18, 1953, Serial No. 355,751

10 Claims. (Cl. 241—5)

The present invention relates to a novel method of and apparatus for treating a solid material, as by pulverizing, drying, distilling volatile materials therefrom, or chemically reacting such a material with a vapor.

It has been proposed to treat solid materials by forming a slurry of particles of the material in a liquid such as water, and then passing the slurry through a long externally heated tube within which the liquid is vaporized to form a rapidly flowing highly turbulent dispersion of solid particles in vapor. One of the principal uses for this method is in the pulverizing of solid materials such as talc, coal, barite, and oyster shells, the pulverized product usually being recovered in a substantially dry condition. The passing of a slurry through an externally heated tube in which the liquid is vaporized has also been suggested for distilling volatile materials from a carbonaceous substance such as coal; and for chemically reacting the coal with vapor.

When heating a liquid slurry by applying heat to the outside of a tube, the heating efficiency is low and the gaseous products of combustion are of no value in propelling the particles along. Also, solid particles may deposit on the tube walls in the slurry zone when external heating is employed, in some instances to such an extent as to plug the tube. It is believed that such deposition occurs because the externally heated tubular walls are so hot that local vaporization of liquid occurs at the walls in the slurry zone even when the remainder of the slurry is still in liquid form, with the result that the solid particles from which the liquid has vaporized accumulate on the walls as a scale.

In accordance with the present invention there is provided a novel method for treating a flowable mixture such as a slurry in such a way that the advantageous results of the prior art are obtained while obtaining higher heating and propelling efficiency and avoiding the undesirable deposition of solid particles on the walls of the tube. These desirable results are obtained by providing a slurry of particles of solid material in a liquid, then passing the slurry into a vaporizing chamber wherein the slurry is efficiently heated internally by direct contact with a heating element, such as a flame within the chamber, to vaporize liquid and form a dispersion of solid particles in a flowing stream of vapor, and thereafter discharging the dispersion from the chamber. After discharge the dispersion can be treated in any desired way, as by passing it through a long heated tube within which the particles are ground, or within which the distillation of volatiles or chemical reactions with the vapor can occur. After treatment in the long tube the dispersion can be discharged into a suitable separator of conventional type, such as a cyclone, within which the hot vapors including any distilled volatile material and gaseous products of chemical reaction are separated from the solid product.

By following the procedure described above, the deposition of solid particles from a slurry on the walls of the system is prevented since the walls themselves are not directly heated but remain relatively cool while the slurry is heated directly by the flame. Consequently, there is always liquid present to wash the walls clean. This is true even when the liquid has been partially vaporized since the relatively cool walls condense any vapor coming into contact therewith and the condensate washes the walls. By relative coolness of the vaporizing chamber walls is meant that they are maintained at a temperature sufficiently lower than the boiling point of the liquid that the condensation of vapor occurs. This condition can prevail even though some external heating of the vaporizer may be employed at some points along the tube for greater efficiency.

The method of internal heating described above is additionally advantageous because the gaseous products of combustion from the heating flame within the vaporizing chamber flow with the dispersion and increase its velocity, while at the same time assisting the formation of a dry solid product. Also, for a given relation of pressure and velocity, the cooled gases and vapor may operate at substantially lower temperatures.

Among the materials which can be treated successfully by the method of this invention are carbonaceous materials such as coal, noncarbonaceous minerals such as limestone, gypsum, chalk, clay, marl, talc, and barite, metals such as aluminum and magnesium, and other materials such as oyster shells.

The invention will be described more in detail below in connection with the accompanying drawings, wherein:

Figure 1 is a schematic side elevational view, parts being broken away and shown in section, of an arrangement of apparatus for performing the method of the invention; and Figure 2 is a longitudinal sectional view of an internal combustion burner which can be used in the apparatus of Figure 1.

With reference to Figure 1, a slurry of solid material in liquid is provided as by mixing the liquid and granular solid together in a slurry mixer 11. From the mixer 11 the slurry passes in a continuous stream through a pump 13 to a pressurized preheater chamber 15 having an agitator 17 for keeping the solids suspended, and a heating coil 19 through which hot fluid is circulated to heat the slurry to a high temperature. The linear velocity of slurry flow through pump 13 advantageously may be between ½ and 10 feet per second.

From the preheater 15 the slurry flows continuously by way of a conduit 21 into a vaporizer chamber 23 containing an axially disposed burner 25 which is supplied with a fluid fuel such as kerosene, butane, or fuel oil through a conduit 27, and with a combustion supporting fluid such as air or oxygen through a conduit 29. The burner 25 advantageously faces in the direction of slurry flow through the vaporizer 23 so that the high velocity gaseous products of combustion in the flame 30 serve to entrain fluid and impel it in the desired direction, thus expediting the flows of the slurry and subsequent vaporous dispersion.

As shown in Figure 2, the fuel and combustion supporting gas mix together in a throat 31 in burner 25 and pass into an internal combustion chamber 33 within which combustion at a high temperature is maintained. Ignition is initially accomplished by a spark plug or other conventional igniting device. The hot flaming gaseous products of combustion leave chamber 33 at high velocity through a discharge passage 35 for heating the slurry. The discharge passage 35 advantageously is shaped as a convergent-divergent nozzle so as to give the hot gases a supersonic velocity for assisting the flow of slurry and dispersion.

Slurry flows in the vaporizer chamber 23 through the annulus surrounding burner 25 in intimate contact therewith so as to cool the burner while heating the liquid. When the liquid comes into contact with the flame 30 below the burner it is rapidly heated to its vaporization temperature with the resultant formation of a dispersion of solid particles in vapor which is then discharged from the vaporizer chamber through a discharge conduit 39.

It is also possible to heat the slurry to vaporization in preheater 15 and then superheat the resulting dispersion in chamber 23. Also, instead of having the burner in the chamber 23 it is possible to feed the hot gases in from a remote point.

In the modification shown in Figure 1 the flowing dispersion passes by way of the conduit 39 into a heating zone 41 which may comprise a tube, having substantial length compared to its inside diameter, heated externally by a gas or oil flame within a furnace 43. This heat maintains the temperature of the dispersion well above the boiling point of the slurry liquid within the tube and causes the dispersion to flow at a high velocity to effect grinding, drying, distillation, or chemical reaction, as desired. Of course, one or more internal combustion burners similar to that of Figure 2 could also be located within the tube 41 instead of or in addition to the external heating of the tube.

Heating zone 41 may be located in a tube having any desired configuration, such as straight or coiled or arranged as a series of parallel tubes having return bends. For grinding, the linear velocity should exceed 25 feet per second which is about the minimum velocity for carrying many materials through a tube. As a practical matter, to assure rapid and substantial disintegration adequate for commercial operation, the velocity is usually maintained above 100 feet per second and may sometimes be as high as one to several thousand feet per second.

When only pulverization of the solid particles is desired, conditions should be such in the tubular zone 41 that the solid particles remain substantially unchanged chemically as they pass through. In the case of chemically stable materials such as talc, clay or barite, the primary consideration is to maintain the temperature low enough to prevent physical damage to the equipment. Materials that are stable chemically can be disintegrated up to 1,400° F. under low pressure without damaging the equipment, but high pressures may require lower temperatures such as a 1,200° F. maximum. Less stable materials may require lower maximum temperatures. For example, volatiles may be distilled off and some chemical reaction with vapor may occur when grinding anthracite coal above 1,100° F., bituminous coal above 850° F., and lignite above 700° F.

Of course, when the distillation of volatiles or chemical reaction with the vapor is desired, then the temperature should be maintained above the minimum values mentioned above for the less stable materials such as coal.

The dispersion is discharged from the heating zone 41 through a conduit 45 into a separator 47 such as a conventional centrifugal cyclone, wherein the hot vapor is separated and discharged through a conduit 49 at the top of the cyclone, and the hot solid material is discharged from the bottom through a discharge conduit 51 in a substantially dry condition.

The hot vapors pass by way of conduit 49 to the heating coil 19 within preheater 15 and thus effect substantial heat economy by exchanging their heat with the incoming slurry. From the coil 19 the hot vapors leave by way of a conduit 53 and can be collected and used in any desired way. Additional hot gas can be supplied to coil 19 by a conduit 51. If desired, the hot exhaust gases from conduit 49 can be discharged into preheater 15 for direct contact heating of the slurry.

Water is generally the liquid used for preparing a slurry. However, other liquids which can be used successfully are hydrocarbons such as kerosene, and other liquids such as coal tar distillates, alcohols, glycols, mercury, diphenyl, carbon tetrachloride, and the like. Water and oil mixtures suitably in the form of emulsions may also be used in preparing the slurry. Hydrocarbon liquids such as kerosene are particularly valuable when grinding a material such as aluminum or magnesium which tends to react with steam, since they are inert to such materials.

The solid particles combined with liquid to form a slurry should be of such size that they can be passed through the tubular heating zone without difficulty, for example, having a diameter less than 1/3 the internal diameter of the tube 41. To assure a stable slurry it is preferably to use particles smaller than about 1/4 inch in average diameter.

The proportion of liquid mixed with the solid to form a slurry may vary considerably but generally is less than 2:1 by volume, often being about 1:1.

Obviously many modifications and variations of the invention, as hereinbefore set forth, may be made without departing from the spirit and scope thereof, and therefore only such limitations should be imposed as are indicated in the appended claims.

I claim:

1. A method for pulverizing particles of a solid disintegratable material comprising providing a flavorable mixture of particles of said solid material in a vaporizable liquid; passing said mixture into a vaporizing chamber; heating said mixture by direct contact with a heating flame in said chamber to vaporize liquid and form a dispersion of solid particles in a flowing stream of vapor; and passing said dispersion through a pulverizing zone at a velocity greater than 25 feet per second in highly turbulent flow to effect reduction in the size of said particles.

2. A method in accordance with claim 1, also comprising maintaining the temperature of said dispersion well above the boiling point of said liquid during passage thereof through sad pulverizing zone by heating said pulverizing zone.

3. A method for treating a solid material comprising providing a flowable mixture of particles of said solid material in a liquid; passing said mixture into a vaporizing chamber; heating said mixture by direct contact with a heating element within said chamber to vaporize liquid and form a dispersion of solid particles in a flowing stream of vapor; discharging said dispersion from said chamber; and passing said discharged dispersion through a heated tube.

4. A method for treating a solid material comprising providing a flowable mixture of particles of said solid material in a liquid; passing said mixture into a vaporizing chamber; heating said mixture by direct contact with a heating element within said chamber to vaporize liquid and form a dispersion of solid particles in a flowing stream of vapor; discharging said dispersion from said chamber; separating the vapor from the solid particles of said dispersion after discharge thereof from said chamber; and passing the separated vapor in heat exchange relationship with said mixture to preheat the latter before it enters said chamber.

5. Apparatus for treating a solid material comprising first means for forming a flowable mixture of particles of said solid material in a vaporizable liquid; a vaporizing chamber in communication with said first means for receiving a stream of mixture therefrom; a heater associated with said vaporizing chamber for introducing heat into direct contact with said mixture to vaporize liquid and form a dispersion of solid particles in a flowing stream of vapor; an outlet for discharging said dispersion from said chamber; a preheater between said first means and said vaporizing chamber for preheating said mixture before entering said vaporizing chamber; and means connected to said outlet for separating vapor from solid particles of said dispersion after discharge thereof from said chamber, said last named means having an outlet for vapor connected to said preheater for preheating said mixture with said vapor.

6. Apparatus for treating a solid material comprising first means for forming a flowable mixture of particles of said solid material in a vaporizable liquid; a vaporizing chamber in communication with said first means for receiving a stream of said mixture therefrom; means for passing a continuous stream of mixture through said chamber; a heater associated with said vaporizing chamber operable for introducing a heating medium into said chamber in direct contact with said mixture to vaporize liquid and form a dispersion of solid particles in a flowing stream of vapor, said heater being an internal combustion burner located within said chamber in spaced relation to the wall of said chamber whereby mixture flows in contact with said burner to cool said burner; and an outlet for discharging said dispersion from said chamber.

7. Apparatus in accordance with claim 6 also comprising an elongated tube connected to said outlet, and means for heating the dispersion flowing in said tube.

8. A method for pulverizing particles of a solid disintegratable material comprising providing a flowable mixture of particles of said solid material in a vaporizable liquid; passing said mixture into a vaporizing chamber; heating said mixture by direct contact with a heating flame in said chamber to vaporize liquid and form a dispersion of solid particles in a flowing stream of vapor; passing said dispersion through a succeeding zone of high velocity flow, and subjecting the flowing stream therein to turbulence and a velocity of the order of at least 25 feet per second thereby effecting disintegration of said particles; and discharging from said succeeding zone of high velocity flow said stream containing finely ground solids suspended therein.

9. A method in accordance with claim 3 wherein the heating of said mixture is accomplished by providing an internal combustion burner within said chamber, wherein said heating element is a flame produced by burning a combustible mixture within said burner and discharging said burning combustible mixture therefrom, and wherein said flowable mixture flows in direct contact with said burner to cool said burner.

10. A method in accordance with claim 3, wherein said heating element is a flame produced by burning a combustible mixture, and wherein the combustion gases flow at high velocity in the same direction as said flowable mixture to entrain fluid and impel it in said direction thus expediting the flows of the flowable mixture and subsequent vaporous dispersion.

References Cited in the file of this patent

UNITED STATES PATENTS

| Number | Name | Date |
|---|---|---|
| Re. 16,749 | Holliday | Sept. 27, 1927 |
| 729,009 | Sutton et al. | May 26, 1903 |
| 1,471,765 | Wilson | Oct. 23, 1923 |
| 1,475,502 | Manning | Nov. 27, 1923 |
| 1,574,950 | Wade | Mar. 2, 1926 |
| 1,759,702 | Koon | May 20, 1930 |
| 2,142,983 | Thurman | Jan. 3, 1939 |
| 2,184,300 | Hodson et al. | Dec. 26, 1939 |
| 2,306,462 | Moorman | Dec. 29, 1942 |
| 2,441,613 | Balassa | May 18, 1948 |
| 2,560,807 | Lobo | July 17, 1951 |
| 2,568,400 | Kearby | Sept. 18, 1951 |
| 2,640,761 | Wiseman | June 2, 1953 |
| 2,669,509 | Sellers | Feb. 16, 1954 |
| 2,712,351 | Roth | July 5, 1955 |

UNITED STATES PATENT OFFICE

CERTIFICATE OF CORRECTION

Patent No. 2,830,769                                              April 15, 1958

Lincoln T. Work

It is hereby certified that error appears in the printed specification of the above numbered patent requiring correction and that the said Letters Patent should read as corrected below.

Column 4, line 24, for "flavorable" read -- flowable --.

Signed and sealed this 27th day of May 1958.

(SEAL)
Attest:

KARL H. AXLINE                                            ROBERT C. WATSON
Attesting Officer                                        Commissioner of Patents